United States Patent [19]

Willison

[11] Patent Number: 4,606,516

[45] Date of Patent: Aug. 19, 1986

[54] AIRCRAFT PROTECTIVE DEVICE

[76] Inventor: George R. Willison, Box 5255, High Point, N.C. 27262

[21] Appl. No.: 608,719

[22] Filed: May 10, 1984

[51] Int. Cl.[4] .............................................. B64D 45/00
[52] U.S. Cl. .................................... 244/121; 244/1 R; 150/52 R
[58] Field of Search ....................... 244/121, 1 R, 213; 150/52 R, 52 K; 206/521, 523, 586; 428/316.6, 68, 76

[56] References Cited

U.S. PATENT DOCUMENTS

| | | | |
|---|---|---|---|
| 2,526,389 | 10/1950 | Montefelco | 244/1 R |
| 3,044,516 | 7/1962 | Stoll | 244/1 R |
| 3,607,601 | 9/1971 | Miliam et al. | 428/316.6 |
| 3,815,650 | 6/1974 | Hickey | 244/1 R |
| 4,053,341 | 10/1977 | Kleiner et al. | 428/316.6 |
| 4,147,828 | 4/1979 | Heckel et al. | 428/316.6 |
| 4,288,490 | 9/1981 | Alfter et al. | 428/316.6 |
| 4,413,735 | 11/1983 | Little | 206/523 |

FOREIGN PATENT DOCUMENTS 2549296 10/1976 Fed. Rep. of Germany ... 428/316.6

*Primary Examiner*—Trygve M. Blix
*Assistant Examiner*—Rodney Corl

[57] ABSTRACT

A protective device for outer airplane surfaces is provided which includes a laminate to envelop, for example a portion of an airplane wing having a water-impervious dense outer layer and a less dense inner layer to provide impact resistance to prevent damage to the airplane wing and which is easily removed prior to flying.

5 Claims, 5 Drawing Figures

U.S. Patent    Aug. 19, 1986    4,606,516
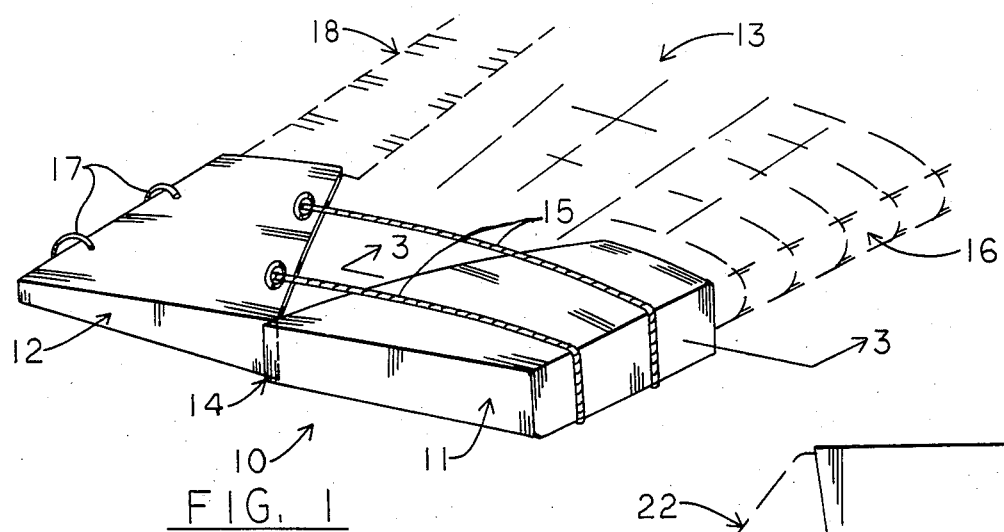
FIG. 1
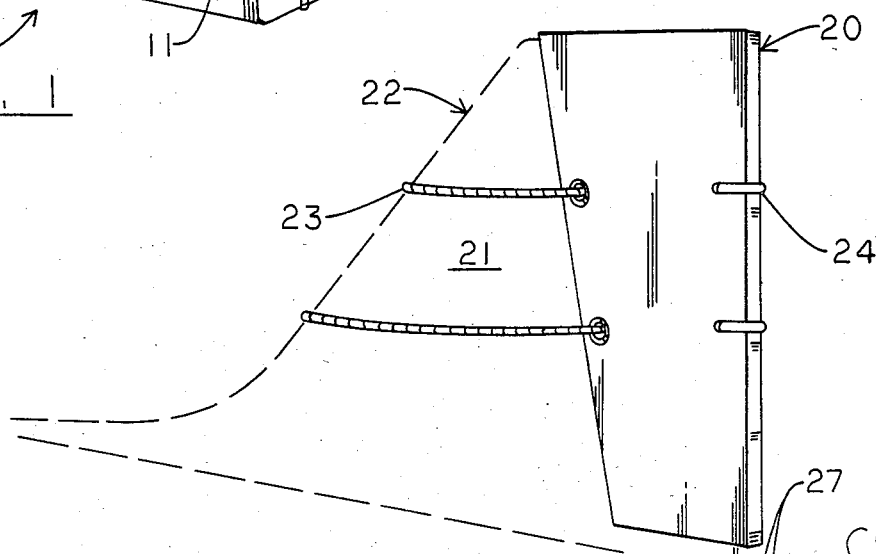
FIG. 2
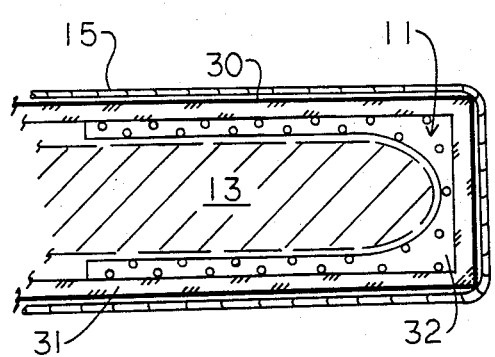
FIG. 3
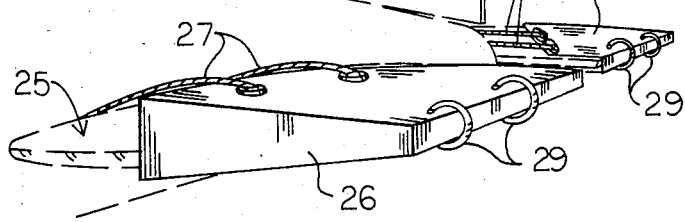
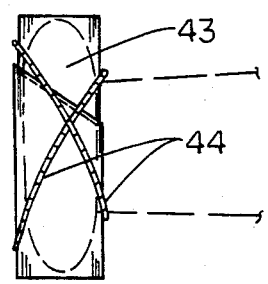
FIG. 5            FIG. 4

AIRCRAFT PROTECTIVE DEVICE

BACKGROUND OF THE INVENTION

1. Field Of The Invention

This invention relates to an improved protective device for outer aircraft or air control surfaces such as wings, wing-tanks, rudders and elevators which can become damaged during periods of non-use such as might occur during in-hanger storage. The protective device of the invention comprises a laminate which has a tough, water-imperative outer layer and a less dense inner layer which can be quickly attached or removed from the aircraft.

2. Description Of The Prior Art And Objectives of the Invention

Small aircraft are often stored for extended periods of time in hangers and other locations and often have to be moved about by maintenance personnel by manual efforts, oftentimes in close or cramped areas where storage space is at a minimum. Wing and tail surfaces are often bumped or scratched as the exposed outer surfaces are quite fragile to impact forces and are expensive to repair. It is not uncommon for ground personnel, while rolling one (1) plane out of a hanger to midjudge the wing-tip clearance between it and another plane and allow the wing-tips to brush one another thereby causing damage to both wing-tips, much to the dismay of the plane owners.

With this background in mind the present invention was developed in one of its main objectives is to provide an aircraft protective device which will protect wing and tail surfaces from minor brushes and collisions as occur during periods of storage.

It is another objective of the present invention to provide an laminated aircraft protective device which has a dense water-impervious outer layer formed from a polymeric material and a less dense closed cell polymeric foam inner layer.

It is yet another objective of the present invention to provide an aircraft protective device which can be quickly attached to the aircraft and which can be rapidly and easily removed prior to flight.

It is still another objective of the present invention to provide an aircraft protective device which has a plurality of resilent cords for simple attachment purposes.

Other advantages and objectives of the invention will be readily apparent to those skilled in the art as a more detailed description of the invention is set forth below.

SUMMARY OF THE INVENTION

The hereinbefore and other objectives of the invention are accomplished by utilizing a laminate envelope formed from a water-impervious polymeric material which is shaped to envelop certain outer aircraft surfaces such as wing-tips, wing-tanks, rudders or the like. The laminated envelope may have a plurality of resilient cords for removably attaching it to the wing or other surface so that the protective device can be easily and quickly removed before flight.

BRIEF DESCRIPTION OF THE DRAWINGS

FIG. 1 demonstrates the protective device of the invention positioned on the tip of a typical airplane wing;

FIG. 2 demonstrates the protective device on the elevator and rudder tail surfaces of an airplane;

FIG. 3 shows a cross sectional view of the protective device shown along lines 3—3 of FIG. 1;

FIG. 4 demonstrates the top view of the device as shown on a wing tip tank; and

FIG. 5 demonstrates the bottom view of the device as shown in FIG. 4.

DESCRIPTION OF THE PREFERRED EMBODIMENT

The preferred form of the protective device includes a pair of laminated envelope members, each of said members having a first water-impervious layer formed from a polyethylene sheet and a second layer formed from a closed cell polyethylene foam having a density of approximately 2½ lbs. per cubic foot. A third or inside layer of each member is formed from a polyethylene foam having a density of approximately 1 lb. per cubic foot. The laminated envelopes members are constructed to opposingly envelop airplane surfaces and are removably attached by resilient cords.

DETAILED DESCRIPTION OF DRAWINGS

FIG. 1 demonstrates protective device 10 comprising a pair of laminates 11 and 12 which envelop respectively a portion of the leading edge 16 and trailing edge 18 of airplane wing 13. Laminates 11 and 12 are formed to accept the contours of the airplane surfaces and overlap along the tip of the wing at 14. Laminates 11 and 12 are held in place by cords 15 which may be nylon, elastic or otherwise. As shown in FIG. 1 cords 15 are connected to laminate 12 and extend forward toward leading edge 16 of wing 13 where they tightly grasp laminate 11. Cords 15 pass under wing 13 and terminate with hook members 17 along trailing edge 18 thereby securing laminates 11 and 12 in place. To remove protective device 10 hooks 17 are removed and laminates 11 and 12 are easily taken from wing 13.

In FIG. 2 only a single laminate 20 is required on rudder 21 as its leading edge 22 is only remotely vulnerable to bumps or scrapes as may occur during in-hanger movements. Thus, cords 23 wrap around rudder 21 and terminate with hook members 24. Likewise, horizontal tail surfaces 25 may also employ a single laminate 26 on both the left and right surfaces which can be held by resilient cords 27 and terminate with hook members 29.

In FIG. 3 laminate 11 is shown in cross sectional view which shows cords 15 surrounding the outer water-impervious laminate 30 which may be made from 1/16 inch polyethylene sheet. Permanently affixed to layer 30 is inner layer 31 which is formed from a less dense foam such as a closed cell polyethylene foam having a density of approximately 2½ lbs. per cubic foot. A less dense third layer 32 may also be formed from a closed cell polyethylene foam having a density of approximately 1 lb. per cubic foot. The closed cell polyethylene layers will not absorb water or moisture but will provide absorption to shock or impact forces which may strike the dense polymeric outer layer 31. As shown, laminate 11 envelops outer surfaces of wing 13 to provide a secure fit thereto.

Other surfaces, can also be protected in a similar manner and FIGS. 4 and 5 demonstrate laminates 40 and 41 for attachment to wing-tip tank 43. Resilient cords 44 secure laminates 40 and 41 onto wing-tips 43 and hook members 45 are joined to the terminal ends of cords 44 for rapid securement.

Various modifications and changes can be made to the invention as shown herein and the examples and illustrations which are present are for illustrative purposes and are not intended to limit the scope of the invention.

I claim:

1. A protective device for an air control surface having a leading and trailing edge and a tip comprising: a pair of independent rigid laminated envelopes for opposingly enveloping the control surface, the first of said pair of laminated envelopes for envelopment of the leading edge of the control surface and the second of said laminated envelopes for envelopment of the trailing edge of the control surface, securing means, said securing means attached to one of said envelopes, said securing means extending therefrom to the other of said envelopes for maintaining said envelopes on the control surface, and said first envelope and said second envelope coacting to extend protection along the entire tip.

2. A protective device for an air control surface as claimed in claim 1 wherein said securing means is resilient.

3. A protective device for an air control surface as claimed in claim 1 wherein said securing means comprises an elastic cord.

4. A protective device for an air control surface as claimed in claim 1 wherein said second envelope includes securing means for removably attaching said first and said second envelopes to the control surface.

5. A protective device for an air control surface as claimed in claim 1 wherein said first and second envelopes overlap at the tip.

* * * * *